Patented June 19, 1934

1,963,497

UNITED STATES PATENT OFFICE

1,963,497

PAINT HARDENING AND DRYING COMPOUND

Lars S. Larsen, St. Paul, Minn.

No Drawing. Application October 24, 1932, Serial No. 639,302

1 Claim. (Cl. 134—54)

My invention relates to a composition of certain ingredients adapted to be added to oil paints for the purpose of attaining a more lasting, lustrous and hard surfaced painted area of paint applied to any surface in the usual manner.

Among the advantages of my composition, mixed in paint and applied to a surface, a certain hardening action takes place, also a rapid drying. The process involved in this invention applies particularly to oil paints. In an exterior wall for example any oil paint with my improved formula provides a desirable, lasting and hard finish or glazed surface. The surface is dried rapidly but the hardening process continues for approximately three weeks.

Because of the hard or glazed surface presented and the retention of the important oils and turpentine in the applied paint it is longer lasting, and most desirable in appearance.

My composition consists of a mixture of rubber liquefied with turpentine, zinc oxide and denatured alcohol.

The composition is prepared in the following manner and for best results in proportions as follows,—

Saturate a quantity of vulcanized rubber in turpentine for one or two days.

Boil the saturated rubber in turpentine until in liquid condition, using 1 part of rubber to 1 part of turpentine, by liquid measure.

To this liquid add 1 part of dry oxide of zinc (liquid measure) and mix thoroughly. This liquid compound of boiled rubber, turpentine and oxide of zinc is then placed in a suitable container and sealed for a period of two to six days.

After last stated period add one part of denatured alcohol and mix thoroughly. The compound now comprises 1 part of rubber, 1 part turpentine, one part zinc oxide and 1 part denatured alcohol.

When the denatured alcohol is added a reaction or working of the liquid takes place and continues about four days. The compound is then in readiness for use to be added to regular prepared paint or may be stored in any suitable sealed container indefinitely.

The compound above described is added to prepared paint, for good results, in about the proportion of three tablespoonfuls to each pint of paint.

The advantages, action of and ingredients of my compound have now been fully disclosed. It might be added that where rapid drying of the paint is not of importance the compound may be mixed with paint in slightly greater proportion than above stated.

I claim:

The method of conditioning paint, to acquire hardening properties after being applied, which consists in adding to and mixing with an oil paint a compound of boiled turpentine and liquid rubber, oxide of zinc and denatured alcohol, said compound added to the paint in about the proportion of three tablespoonfuls to each pint of paint.

LARS S. LARSEN.